(12) United States Patent
Gilbert et al.

(10) Patent No.: US 11,823,190 B2
(45) Date of Patent: Nov. 21, 2023

(54) SYSTEMS, APPARATUS AND METHODS FOR IMPROVED AUTHENTICATION

(71) Applicant: MasterCard International Incorporated, Purchase, NY (US)

(72) Inventors: Craig Gilbert, Chesterfield, MO (US); Brian John Piel, Ballwin, MO (US); Gregory D. Williamson, Stamford, CT (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1456 days.

(21) Appl. No.: 14/509,247

(22) Filed: Oct. 8, 2014

(65) Prior Publication Data
US 2015/0161608 A1    Jun. 11, 2015

Related U.S. Application Data

(60) Provisional application No. 61/913,670, filed on Dec. 9, 2013.

(51) Int. Cl.
*G06Q 20/40* (2012.01)

(52) U.S. Cl.
CPC ....... *G06Q 20/4014* (2013.01); *G06Q 20/401* (2013.01); *G06Q 20/405* (2013.01); *G06Q 2220/00* (2013.01)

(58) Field of Classification Search
None
See application file for complete search history.

(56) References Cited

U.S. PATENT DOCUMENTS

| 5,892,900 A | * | 4/1999 | Ginter | G06Q 20/02 726/26 |
| 6,658,568 B1 | * | 12/2003 | Ginter | G06Q 20/02 705/51 |

(Continued)

FOREIGN PATENT DOCUMENTS

| CA | 2884416 A1 | * | 3/2014 | ........... G06Q 20/108 |
| CN | 102754116 A | | 10/2012 | |

(Continued)

OTHER PUBLICATIONS

M. M. Mohammed and M. Elsadig, "A multi-layer of multi factors authentication model for online banking services," 2013 International Conference on Computing, Electrical and Electronic Engineering (ICCEEE), 2013, pp. 220-224, doi: 10.1109/ICCEEE.2013.6633936. (Year: 2013).*

(Continued)

*Primary Examiner* — Jacob C. Coppola
*Assistant Examiner* — Eduardo Castilho
(74) *Attorney, Agent, or Firm* — Buckley, Maschoff & Talwalkar LLC

(57) ABSTRACT

A cardholder authentication method includes receiving, at an authentication network, an authentication request involving an account. The method further includes determining, based at least in part on a portion of an account identifier associated with said account, an authentication service. In addition, the method includes determining, based at least on said authentication service and a portion of said account identifier, an authentication response. The method also includes transmitting, to a merchant associated with a transaction involving said account, said authentication response.

10 Claims, 12 Drawing Sheets

(56) References Cited

U.S. PATENT DOCUMENTS

| | | | | |
|---|---|---|---|---|
| 8,326,758 | B2* | 12/2012 | Bennett | G06Q 20/105 705/35 |
| 8,572,391 | B2 | 10/2013 | Golan et al. | |
| 9,589,266 | B2* | 3/2017 | Pourfallah | G06Q 20/3276 |
| 9,978,062 | B2* | 5/2018 | Raj | G06Q 20/3821 |
| 2002/0194138 | A1* | 12/2002 | Dominguez | G06Q 20/12 705/64 |
| 2004/0153407 | A1* | 8/2004 | Clubb | G06Q 20/105 705/41 |
| 2004/0232225 | A1* | 11/2004 | Bishop | G06Q 20/04 235/380 |
| 2004/0254848 | A1 | 12/2004 | Golan et al. | |
| 2005/0246278 | A1 | 11/2005 | Gerber et al. | |
| 2007/0130463 | A1 | 6/2007 | Law et al. | |
| 2007/0198435 | A1* | 8/2007 | Siegal | G06Q 20/085 705/67 |
| 2007/0257103 | A1* | 11/2007 | Fisher | G06Q 20/24 235/380 |
| 2008/0097925 | A1* | 4/2008 | King | G06Q 20/02 705/67 |
| 2008/0103972 | A1* | 5/2008 | Lanc | G06Q 20/325 705/44 |
| 2009/0070246 | A1* | 3/2009 | Tieken | G06Q 20/40 705/35 |
| 2009/0106151 | A1* | 4/2009 | Nelsen | G06Q 20/405 705/44 |
| 2010/0063895 | A1 | 3/2010 | Dominguez et al. | |
| 2010/0070354 | A1* | 3/2010 | Fordyce, III | G06Q 30/0229 705/14.3 |
| 2010/0274688 | A1* | 10/2010 | Hammad | G06Q 20/40 705/44 |
| 2011/0184866 | A1* | 7/2011 | Shakkarwar | G06Q 20/10 705/44 |
| 2011/0218879 | A1 | 9/2011 | Roche et al. | |
| 2012/0079581 | A1* | 3/2012 | Patterson | H04L 63/0861 726/7 |
| 2012/0095872 | A1* | 4/2012 | Hurwitz | G06Q 20/02 705/26.41 |
| 2012/0116918 | A1* | 5/2012 | Andersson | G06Q 20/40145 705/26.41 |
| 2012/0221468 | A1* | 8/2012 | Kumnick | G06Q 20/306 705/44 |
| 2013/0024289 | A1* | 1/2013 | Cueli | G06Q 20/027 705/14.65 |
| 2014/0025518 | A1* | 1/2014 | Look | G06Q 20/347 705/21 |
| 2014/0081857 | A1* | 3/2014 | Bonalle | G06Q 20/105 705/41 |
| 2014/0172707 | A1* | 6/2014 | Kuntagod | G06Q 20/40 705/44 |
| 2014/0183258 | A1* | 7/2014 | DiMuro | G06Q 20/3821 235/380 |
| 2014/0195425 | A1* | 7/2014 | Campos | G06Q 20/20 705/41 |
| 2014/0229388 | A1* | 8/2014 | Pereira | G06Q 20/20 705/76 |
| 2014/0279474 | A1* | 9/2014 | Evans | G06Q 20/40 705/41 |
| 2014/0372301 | A1* | 12/2014 | Anamanamuri | G06Q 20/4014 705/44 |
| 2015/0088756 | A1* | 3/2015 | Makhotin | G06Q 20/32 705/71 |
| 2015/0100495 | A1* | 4/2015 | Salama | G06Q 20/3829 705/65 |
| 2015/0112871 | A1* | 4/2015 | Kumnick | G06Q 20/4012 705/67 |
| 2015/0134540 | A1* | 5/2015 | Law | G06Q 20/02 705/44 |
| 2015/0348018 | A1* | 12/2015 | Campos | G06Q 20/12 705/41 |

FOREIGN PATENT DOCUMENTS

| | | | | |
|---|---|---|---|---|
| JP | 2001076068 | A1 | 3/2001 | |
| JP | 2009199235 | A | 9/2009 | |
| JP | 2009211120 | A | 9/2009 | |
| JP | 2013519136 | A | 5/2013 | |
| JP | 2007293713 | A | 11/2017 | |
| RU | 2491733 | C2 | 4/2013 | |
| WO | WO-2013044192 | A2 * | 3/2013 | ....... G06Q 20/38215 |
| WO | WO-2013134832 | A1 * | 9/2013 | ............ G06Q 20/02 |
| WO | 2015/088825 | A1 | 6/2015 | |

OTHER PUBLICATIONS

C. Vivaracho-Pascual and J. Pascual-Gaspar, "On the Use of Mobile Phones and Biometrics for Accessing Restricted Web Services," in IEEE Transactions on Systems, Man, and Cybernetics, Part C (Applications and Reviews), vol. 42, No. 2, pp. 213-222, 2012, doi: 10.1109/TSMCC.2011.2107739. (Year: 2011).*

L. Olejnik and C. Castelluccia, "Towards Web-Based Biometric Systems Using Personal Browsing Interests," 2013 International Conference on Availability, Reliability and Security, 2013, pp. 274-280, doi: 10.1109/ARES.2013.36. (Year: 2013).*

Anonymous, "Biometric Component for Portal Systems and Web Applications," , 2010, retrieved from https://ip.com/IPCOM/000191540. (Year: 2010).*

P. C. Castro, J. W. Ligman, M. Pistoia, J. Ponzo, G. S. Thomas and U. Topkara, "Runtime adaptive multi-factor authentication for mobile devices," in IBM Journal of Research and Development, vol. 57, No. 6, pp. 8:1-8:17, Nov.-Dec. 2013, doi: 10.1147/JRD.2013.2281123. (Year: 2013).*

Z. Z. Hosseini and E. Barkhordari, "Enhancement of security with the help of real time authentication and one time password in e-commerce transactions," The 5th Conference on Information and Knowledge Technology, 2013, pp. 268-273, doi: 10.1109/IKT.2013.6620077. (Year: 2013).*

S. Gupta and R. Johari, "A New Framework for Credit Card Transactions Involving Mutual Authentication between Cardholder and Merchant," 2011 International Conference on Communication Systems and Network Technologies, 2011, pp. 22-26, doi: 10.1109/CSNT.2011.12. (Year: 2011).*

"Patent Examination Report No. 1", Australian Government, dated Jan. 4, 2017, for Australian Application No. 2014364278, 6pgs.

WorldPay, "Cardholder Authentication Guide", Version 4.3, Aug. 2013, Business Gateway, retrieved from Internet on Jan. 4, 2017, <URL: http://docplayer.net/1590508-Cardholder-authentication-guide-version-4-3-august-2013-business-gateway.html>, 19pgs.

Russian Official Action for Application No. 2016127512 dated Sep. 5, 2017, 6 pp.

Russian Search Report for Application No. 2016127512 dated Sep. 5, 2017, 2 pp.

English Translation of Russian Official Action and Search Report dated Sep. 5, 2017, 7 pp.

"PCT Notification of Transmittal of the International Search Report and The Written Opinion of the International Searching Authority, or the Declaration", dated Mar. 6, 2015, for International Application No. PCT/US2014/068137, 7pgs.

"Communication: Supplemental European Search Report", European Patent Office, dated Jul. 27, 2017, for European Application No. 14870265.7, 10pgs.

Japanese Official Action for Application No. 2016-538094 drafted date Sep. 19, 2017, 5pgs.

English Translation of Japanese Official Action drafted date Sep. 19, 2017, 4pgs.

"Canadian Office Action", Canadian Intellectual Property Office, dated Apr. 7, 2017 (Apr. 7, 2017), for Canadian Application No. 2,933,021, 3pgs.

"Korean Final Rejection", Korean Intellectual Property Office (KIPO), for Application No. 10-2016-701890, dated Nov. 26, 2018, 4 pp.

"English Translation of Korean Final Rejection", Korean Intellectual Property Office (KIPO), for Korean Application No. 10-2016-701890, dated Nov. 26, 2018, 3 pp.

(56) References Cited

OTHER PUBLICATIONS

Korean Preliminary Rejection for Application No. 10-2016-701890 dated Mar. 21, 2018, 5 pp.
English Translation of Korean Preliminary Rejection drafted Apr. 3, 2018, 3 pp.
Japanese Office Action for Application No. 2016-538094 dated Aug. 16, 2018, 4 pp.
English Translation of Japanese Office Action drafted Aug. 20, 2018, 4 pp.
"Korean Preliminary Rejection", KIPO, for Korean Patent Application No. 10-2019-7005045, dated May 15, 2019, 5pgs.
"English-language Translation of Korean Preliminary Rejection", drafted May 29, 2019, KIPO, for Korean Patent Application No. 10-2019-7005045, 4pgs.
"First Office Action", PRC Patent Office, for Chinese Application No. 201480067737.3, dated Feb. 19, 2019, 5pgs.
"Korean Notice of Final Rejection", KIPO, for Korean Patent Application No. 10-2019-7005045, dated Nov. 29, 2019, 3pgs.
"English-language Translation of Korean Notice of Final Rejection", dated Nov. 29, 2019, KIPO, for Korean Patent Application No. 10-2019-7005045, 6pgs.
Japanese Official Action for Application No. 2018-237266 drafted date Mar. 23, 2020, 7pgs.
English-language Translation of Japanese Official Action drafted date Mar. 23, 2020, 9pgs.

* cited by examiner

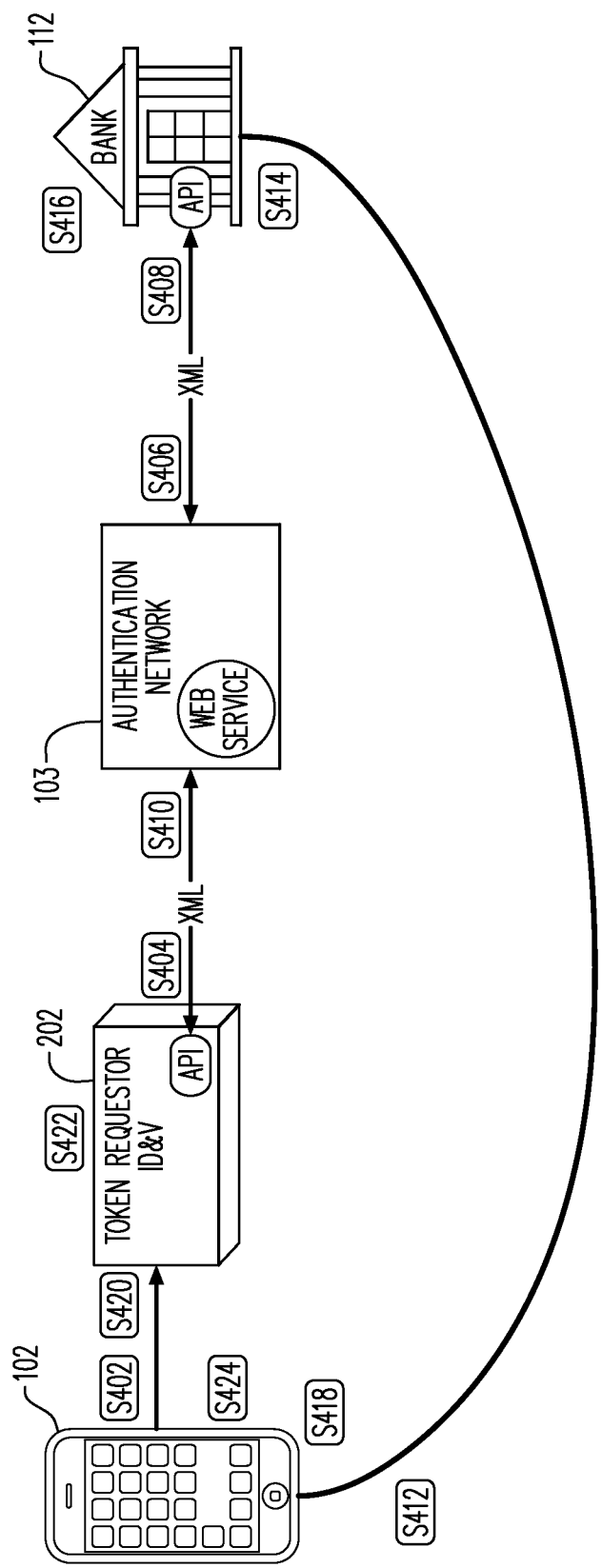

SYSTEMS, APPARATUS AND METHODS FOR IMPROVED AUTHENTICATION

CROSS REFERENCE TO RELATED APPLICATION

This application claims the benefit of U.S. Provisional Patent Application No. 61/913,670 filed on Dec. 9, 2013, the contents of which are hereby incorporated by reference for all purposes.

BACKGROUND

Embodiments of the present invention described herein relate to transactions for payment of goods/services and, more particularly, to the provision of authenticated transactions across multiple channels of commerce.

Card issuers and other financial institutions now offer or use standardized Internet transaction protocols to improve on-line transaction performance and to accelerate the growth of electronic commerce. Under some standardized protocols card issuers or issuing banks may authenticate transactions thereby reducing the likelihood of fraud and associated chargebacks attributed to cardholder not-authorized transactions. One example of such a standardized protocol is the 3-D Secure Protocol. The presence of an authenticated transaction may result in an issuer assuming liability for fraud should it occur despite efforts to authenticate the cardholder during an online purchase. Merchants are assured by card issuers or issuing banks that they will be paid for issuer-authenticated transactions. The 3-D Secure (3DS) protocol is consistent with and underlies the authentication programs offered by card issuers (e.g., Verified by Visa or MasterCard SecureCode) to authenticate customers for merchants during remote transactions such as those associated with the Internet.

The 3-D Secure Protocol leverages existing Secure Sockets layer (SSL) encryption functionality and provides enhanced security through issuer "authentication" of the cardholder during the online shopping session. A piece of software called the Merchant Plug In (MPI) is used by participating merchants to exchange messages, pass information and query participants in order to establish an authentication session between the cardholder and their card issuer during an online purchase. The 3-D Secure Protocol services are generally based on a three-domain model—the issuer domain, acquirer and interoperability domain. The issuer is responsible for managing the enrollment of cardholders in the service, and for authenticating cardholders during on-line transactions. The acquirer is responsible for defining procedures so that merchants participating in Internet transactions operate under an agreement with the acquirer, and for providing back end processing for authenticated transactions. The interoperability domain facilitates the transaction exchange between the other two domains with a common protocol and shared services.

Cardholders and their banks may come under the "Issuer Domain", merchants and their banks may come under the "Acquirer Domain". Communication between issuing and acquiring banks or financial institutions and card issuer infrastructure may come under "Interoperability Domain". While transacting with 3-D Secure compliant banks and merchants, a consumer may have the same Internet shopping experience as previously, except that there is a separate authentication window or i-frame element from the cardholder's bank to determine if the transacting party is indeed the cardholder of record. The transaction flow for an on-line Internet purchase transaction under the protocol may be as follows:

(1) Customers fill in payment data at merchant web sites in the usual fashion, via an encrypted Secure Sockets Layer (SSL) connection.
(2) The merchant then sends a message through an MPI to a directory server or system which in turn queries the card issuer to find out whether the customer is enrolled in the 3-D Secure program.
(3) The card issuer responds to the directory with a message indicating whether the cardholder is enrolled and, if so, provides a Web address for the financial institution that issued the card. This message is then processed and a response forwarded to the merchant.
(4) The merchant then sends a message to the issuing financial institution, through the cardholder device, to initiate an authentication session between the cardholder and the card issuer in which transaction details such as merchant name and transaction amount may also be presented to the cardholder for confirmation.
(5) The issuing financial institution will then populate an authentication window to the cardholder detailing information related to the transaction such as merchant name and amount, a personal security message, and a response area where authentication details can be entered by the cardholder.
(6) The customer approves the transaction in one of a variety of ways, depending on how the issuing financial institution chooses to implement the system. Options may range from entering a static password or PIN to utilizing a smart card and a Personal Card Reader (PCR) to generate an authentication token, and may also include utilizing authentication methods on a consumer device such as a smart phone application or consumer biometric reader.
(7) If the authentication is valid, the issuer sends a message to the merchant indicating the transaction was successful. The issuer also notifies the merchant if the authentication failed or was unable to be completed.

It would be desirable to provide improved authentication systems which are based, at least in part, on the 3-D Secure Protocol described above or on any other authentication protocol.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein:

FIGS. 2-4 are block diagrams of a portion of a transaction system pursuant to some embodiments.

DETAILED DESCRIPTION

Figure 1:
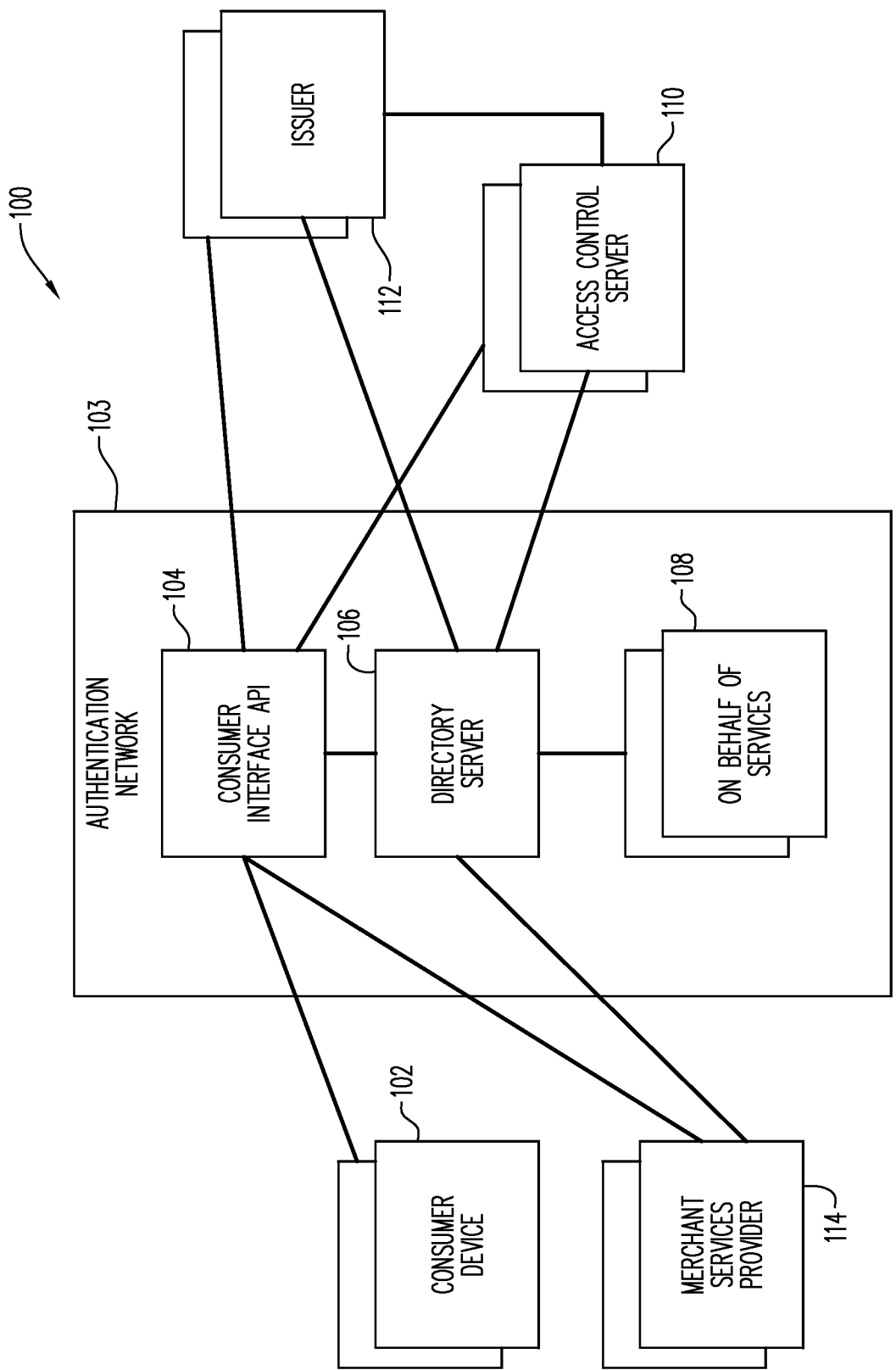
FIG. 1 is a block diagram of a transaction system according to an embodiment of the invention.

In general, and for the purpose of introducing concepts of novel embodiments described herein, provided are systems, apparatus and methods for providing an improved authentication system for financial transactions.

In some embodiments, improved authentication techniques and methods are provided which allow an improved user experience for merchants and consumers, especially when used in conjunction with transactions involving mobile devices. In some embodiments, authentication techniques and methods are provided which allow use with financial transactions involving tokenization (such as transactions following the tokenization standards recently announced by MasterCard International Incorporated and Visa International).

Further, in some embodiments, authentication techniques may include additional authentication levels that may be determined by a card issuer or on a transaction by transaction basis, allowing the authentication required for a given transaction to be enhanced in some situations. Embodiments provide improved adoption of such authentication techniques, as well as the reduction of declined transactions which are legitimate card not present transactions.

Features of some embodiments will now be described by reference to FIG. 1, where a transaction system 100 pursuant to some embodiments is shown. A system pursuant to some embodiments involves a number of devices and entities interacting to conduct a transaction. For example, payment cardholders may interact with one or more consumer devices 102 to initiate financial transactions. Consumer devices 102 may include, for example, mobile phones, computers, set top boxes, or other devices (such as game consoles, or the like). The transactions are card not present transactions (e.g., where no physical card is presented to the merchant during the transaction). Embodiments allow such card not present transactions to be performed with a higher level of authentication than in the past. As used herein, the consumer devices 102 are referred to as being part of the "consumer interaction domain" of the present invention.

Each of the consumer devices 102 may be in communication with one or more devices in an "interoperability domain". The interoperability domain may be at least partly constituted by an authentication network 103. The authentication network 103 may include any device or computer that engages in or facilitates decision-making in regard to what kind or kinds of authentication processing are to be employed for a given transaction. The authentication network 103 may include, for example: (A) one or more servers or devices providing a consumer interface application programming interface ("API") 104, (B) one or more servers or devices providing a directory server 106, and (C) one or more servers or devices providing on-behalf-of (OBO) services 108.

The devices and systems in the "interoperability domain" are in communication with one or more devices or systems in an "issuer domain" such as, for example, one or more access control servers 110, and one or more issuers 112.

Making reference again to the consumer device 102 and the "consumer interaction domain", it should be noted that both of these may interact with the "acquirer domain" in the three domain model. The acquirer domain is at least partly represented in FIG. 1 by block 114, which represents one or more servers or other devices that perform services by or for the merchant that is involved in the current transaction. The merchant services component 114 may, for example, be an e-commerce server operated by the merchant or by a service provider retained by the merchant. It will be noted that the merchant services component 114 may interact with both the consumer device 102 and with one or more components of the authentication network 103.

Pursuant to some embodiments, the present invention allows an improved customer experience in authentication interactions across different types of consumer devices than previous authentication systems. For example, in some embodiments, the need for a merchant plug in may be reduced or eliminated in some situations. Further embodiments allow merchants to maintain their desired look and feel during transactions. In some embodiments, context specific message sets may be provided—for example, tokenization transactions may be provided with authentication support. Pursuant to some embodiments, the interaction between a consumer device 102 and a device in the interoperability domain may depend on an authentication choice made by a merchant. For example, a merchant may use a standard MPI for authentication of transactions involving different consumer devices 102, and in such embodiments, the interaction between the consumer device 102 and a device in the interoperability domain may include interaction with the authentication network 103. A merchant may also (or instead) choose to use an API for interaction during authentication transactions, and in such embodiments, the interaction between the consumer device 102 and a device in the interoperability domain may include interaction with a consumer interface API 104. In either event, the interoperability domain may also be invoked to perform one or more on-behalf-of services by applying rules associated with on-behalf-of services device 108. Pursuant to some embodiments, the application of any on-behalf-of services 108 may be based on information associated with the payment card used by the consumer at the consumer device 102. For example, in some embodiments, whether any on-behalf-of (OBO) service should be applied in a given transaction may be based on BIN- or account-level rules established by a payment card issuer. In addition to or instead of permitting configuration of decisioning on OBO service by the payment card issuer, the transaction system 100 may also incorporate configuration of such decisioning by the cardholder/user of the payment card. In some embodiments, where both issuer-configured and user-configured rules are in effect, a suitable rules hierarchy may be established to determine which rule or rules to apply in a given case. In some embodiments, the rules hierarchy may be established by or in response to the issuer so as to accommodate one or more user-configured rules. In some embodiments, the rules hierarchy may operate so as to override a user-configured rule in favor of a contrary rule established pursuant to issuer configuration input.

A number of different types of on-behalf-of services may be used and applied to transactions pursuant the present invention. For example, on-behalf-of services may be provided which provide additional or enhanced authentication to transactions. For example, a financial account issuer may determine that transactions involving certain accounts should utilize biometric authentication techniques. The on-behalf-of services 108 may be applied to transactions involving such accounts pursuant to the present invention, and the additional biometric authentication requirements may be imposed during such transactions. Other types of on-behalf-of services applied during transactions involving the system of the present invention could include, for example, risk based decisioning services, dynamic verification code services, or the like.

Pursuant to some embodiments, communication between the interoperability domain and the issuer domain may involve one or more interactions (unlike prior authentication solutions). For example, an authentication interaction may involve communication between a consumer device 102, a consumer interface API 104 and an issuer 112. In this manner, issuers, merchants and consumers may participate in the authentication system of the present invention without need to interact with an ACS or without need to use an MPI. Such interactions may also invoke the application of one or more on behalf services 108. Pursuant to some embodiments the use of the consumer interface API 104 allows the provision of authentication web services across a wide variety of devices. Further, on-behalf-of services may be made available to all issuers, allowing for an enhanced transaction experience. For example, an issuer may select to utilize risk based decisioning (or "RBD") and an RBD service may be applied to transactions associated with that issuer (or a predetermined subset of accounts associated with the issuer). Pursuant to some embodiments, the authentication network 103 may be configurable for each issuer 112, allowing unique routing per message type and per BIN (or account number) range. For example, some elite cards may be configured to use an on behalf service providing RBD, and all other card types from that issuer may be sent to an ACS for authentication processing. In some embodiments, the use of the consumer interface API 104 allows the ACS 110 and/or the issuer 112 to interact with a consumer device 102 via a secure channel.

Figure 2:
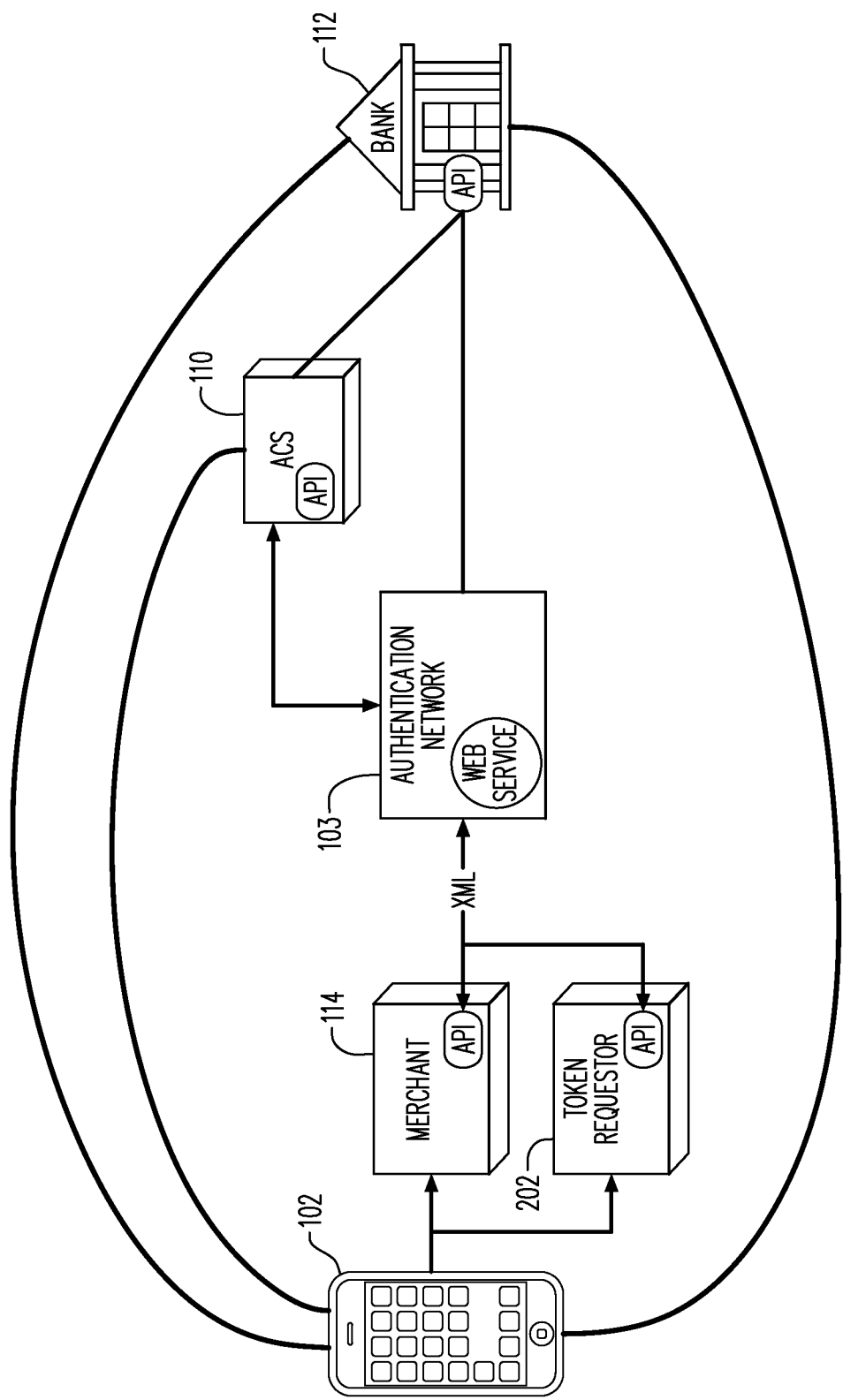
Figure 3:
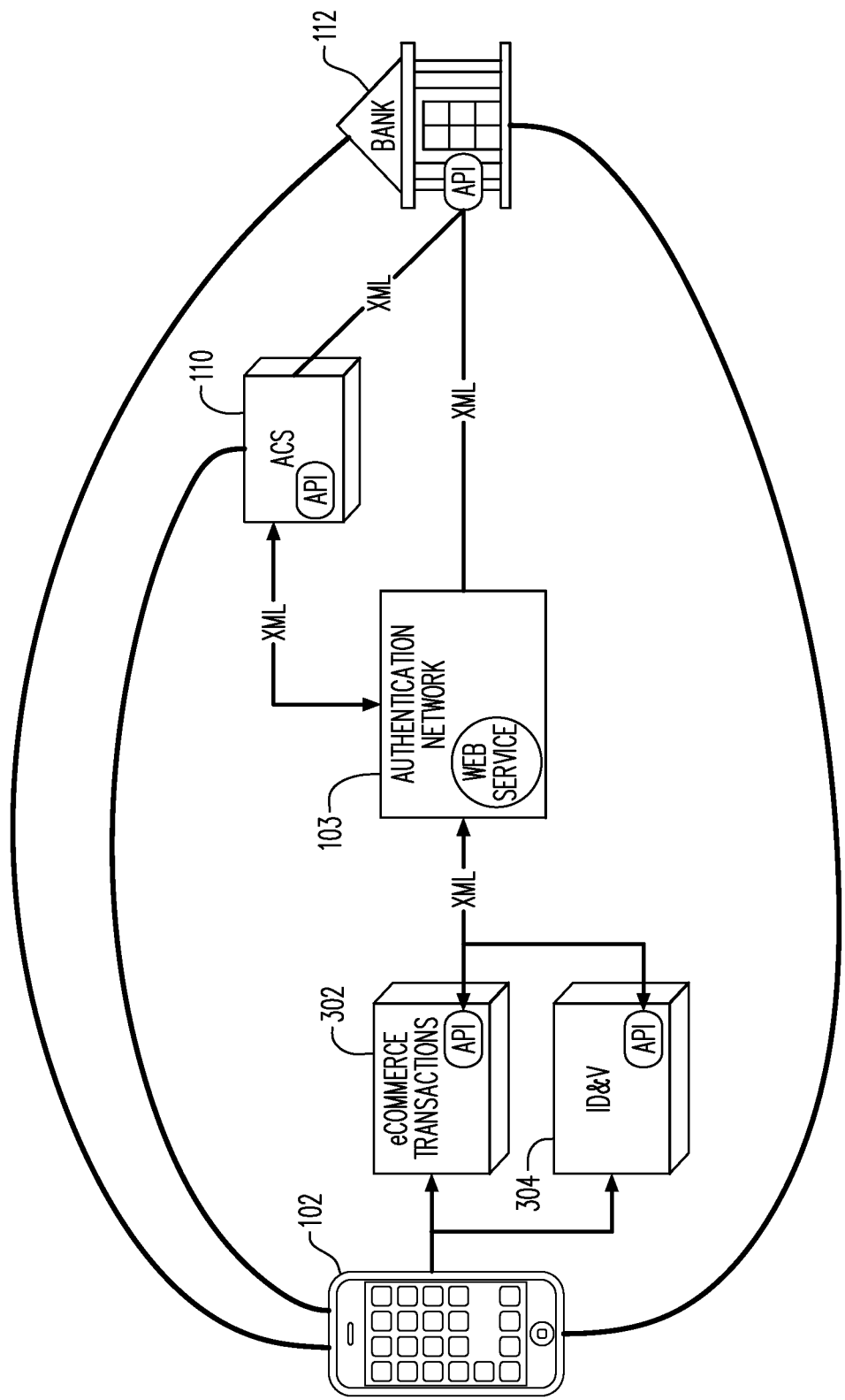

Illustrative examples of various combinations of authentication flows are shown in FIGS. 2-4 (in each, the consumer device 102 is depicted as being a mobile device for illustration purposes only—a wide variety of consumer devices may be used in each of the flows).

In the authentication flow of FIG. 2, tokenization may be implemented (i.e., with a payment token in use in at least part of the transaction flow instead of a PAN (primary account number)). For that reason, the consumer device 102 may interact with a token requestor server 202 as well as the merchant services provider 114. In the example shown in FIG. 2, interaction between the consumer device 102 and the token requestor 202, and between the consumer device 102 and the merchant services provider 114 may be via an API. Similarly, any necessary interaction between the ACS 110 and the issuer 112 (on one hand) and the consumer device 102 (on the other hand) may also be via API. Communication among the authentication network 103, the merchant services provider 114 and the token requestor 202 may be web-based, via XML (extensible markup language), JSON (JavaScript Object Notation), or other communication format.

In FIG. 3, an embodiment is depicted where the consumer device 102 may be used in either an ecommerce transaction—block 302 (via an API communication with the authentication network 103) as well as in an identification and verification ("ID&V") transaction—block 304 (via an API communication with the authentication network 103). In some transactions, the authentication network 103 is in communication with an ACS 110, and in others, the authentication network 103 is in communication with the issuer 112.

In FIG. 4, an embodiment is depicted with various messaging steps identified and showing the use of the API of the present invention in conjunction with a tokenization transaction. At S402, the cardholder/user initiates the ID&V process by operating the consumer device 102. At S404, the token requestor 202 sends the PAN and all applicable device information via API to the authentication network 103.

At S406, the authentication network 103 receives the request and determines that the applicable process flow is for ID&V. As part of this step, the authentication network 103 looks up the appropriate issuer interface and sends an ID&V request over the interface to the issuer 112. (If no appropriate issuer interface is available, the authentication server responds accordingly to the token requestor 202 and the process terminates at that point.)

At S408, the issuer 112 responds to the authentication network 103 to acknowledge the ID&V process flow.

At S410, the authentication network 103 forwards the issuer response and the issuer API reference back to the token requestor 202.

At S412, the token requestor 202 sends an ID&V confirmation request to the web service of the issuer 112 via the consumer device 102.

At S414, the issuer 112 receives the ID&V confirmation request.

At S416, the issuer 112 validates the request and then the ACS (FIG. 1, not shown in FIG. 4) creates an ID&V response message.

At S418, the issuer 112 returns the ID&V response to the token requestor 202 via the consumer device 102. (In addition, the issuer 112 may send selected ID&V transaction records to a history server, which is not shown.)

At S420, the token requestor 202 receives the ID&V response.

At S422, the token requestor 202 validates the ID&V response.

At S424, in the case of a positive response, the token requestor 202 completes the tokenization of the consumer device 102; in the case of a negative response, the same is communicated at this point from the token requestor 202 to the consumer device 102.

Figure 5A:
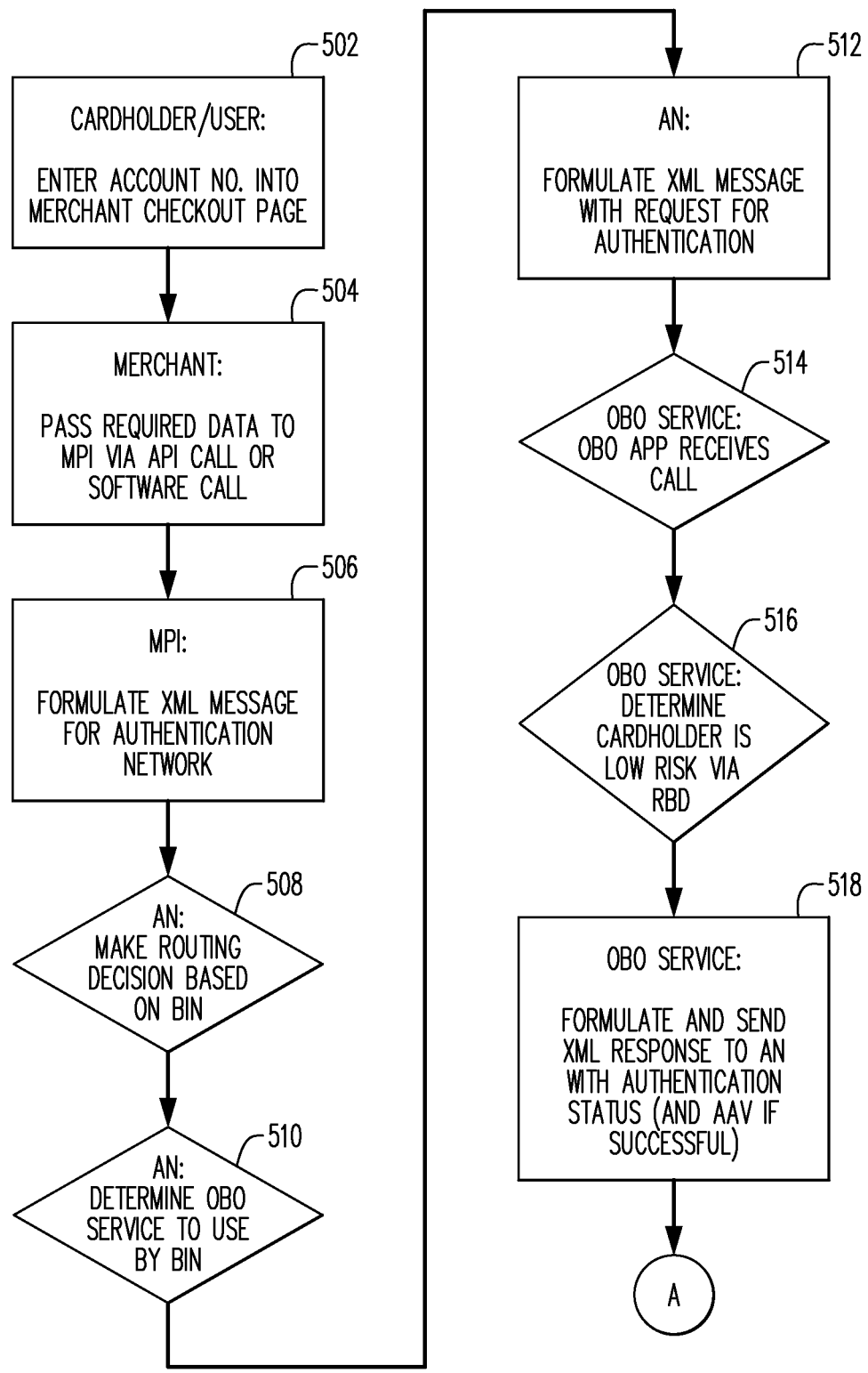
FIGS. 5A-6C are flow diagrams illustrating processes according to some embodiments.
Figure 5B:
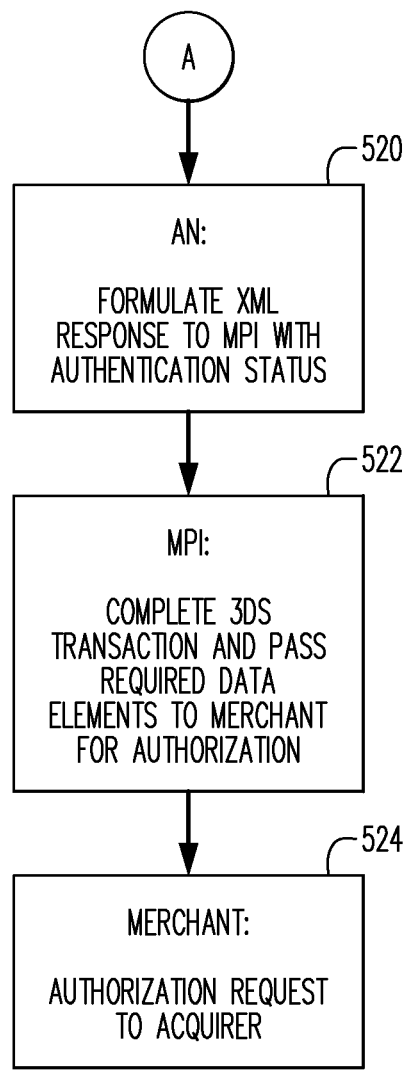

Illustrative examples of transaction flows which involve the on-behalf-of services features of the present invention are shown in FIGS. 5A-6C. In FIGS. 5A-6C, the use of a merchant plugin ("MPI") is shown—however, embodiments may include flows without an MPI (e.g., where communication between the consumer device 102 and an interoperability layer is via an API or other connection). In the illustrative embodiment of FIGS. 5A/5B, a first scenario is shown where one or more on-behalf-of services are applied to a transaction during processing. In the processing of FIG. 5A, a cardholder/user interacts (block 502, FIG. 5A) with a consumer device 102 to conduct a transaction with a merchant; this may include the user entering payment card account data into the merchant e-commerce checkout page. The merchant causes payment account data associated with the cardholder to be transmitted (block 504) to an interoperability domain (e.g., to the above mentioned MPI; this may occur via an API call or a software call, for example).

At block 506, the MPI may generate and transmit a corresponding message to the authentication network 103 (FIG. 1). Referring again to FIG. 5A, at decision block 508, the authentication network 103 (e.g., via directory server 106) makes a routing determination based on the payment account data (e.g., such as based on the BIN of the payment account). Based on the routing determination, a determination may be made (at decision block 510) that some on-behalf-of services are to be applied (e.g., based on information provided by the issuer of the payment account). Again this determination may be made by the authentication network 103 (possibly via the directory server 106).

At block 512, the authentication network 103/directory server 106 then causes a message (such as, for example, an XML message or the like) to be transmitted to the on-behalf-of services 108 for processing. At decision block 514, the OBO service 108 may determine that a corresponding app that it hosts has received the message referred to above in connection with block 512. In the illustrative example, shown in FIG. 5A, the on-behalf-of services processing 108 determines (decision block 516) that the cardholder is a low risk cardholder (e.g., using a risk based decisioning service) and a response is transmitted (block 518) from the OBO service 108 to the authentication network 103 with the authentication response. Where the authentication is deemed successful, as assumed here, then the response may include a transaction cryptogram or other token such as an "AAV" (account authentication value). The data provided by the OBO service 108 is forwarded (block 520, FIG. 5B) from the authentication network 103 to the MPI. Then, as indicated at 522 in FIG. 5B, the MPI may complete the 3DS transaction and transmit required data elements to the merchant 114 (FIG. 1) to allow the merchant to proceed (block 524) with what may be an essentially conventional authorization request to the acquirer (not shown). The transaction may then be completed in accordance with conventional practices for e-commerce transactions.

In some embodiments, the processing by the interoperability domain may include a determination that some "step up" or increased authentication may be required for a transaction. Such an example is shown in the flow diagram formed by FIGS. 6A/6B/6C, where the on-behalf-of service 108 determines that the cardholder or transaction requires additional authentication method(s) and causes some additional processing to be performed by the consumer and/or the merchant to complete the transaction. In this manner, embodiments allow improved authentication processing to be performed. Issuers are able to provide "step up" or additional services that can easily be applied to transactions.

Figure 6A:
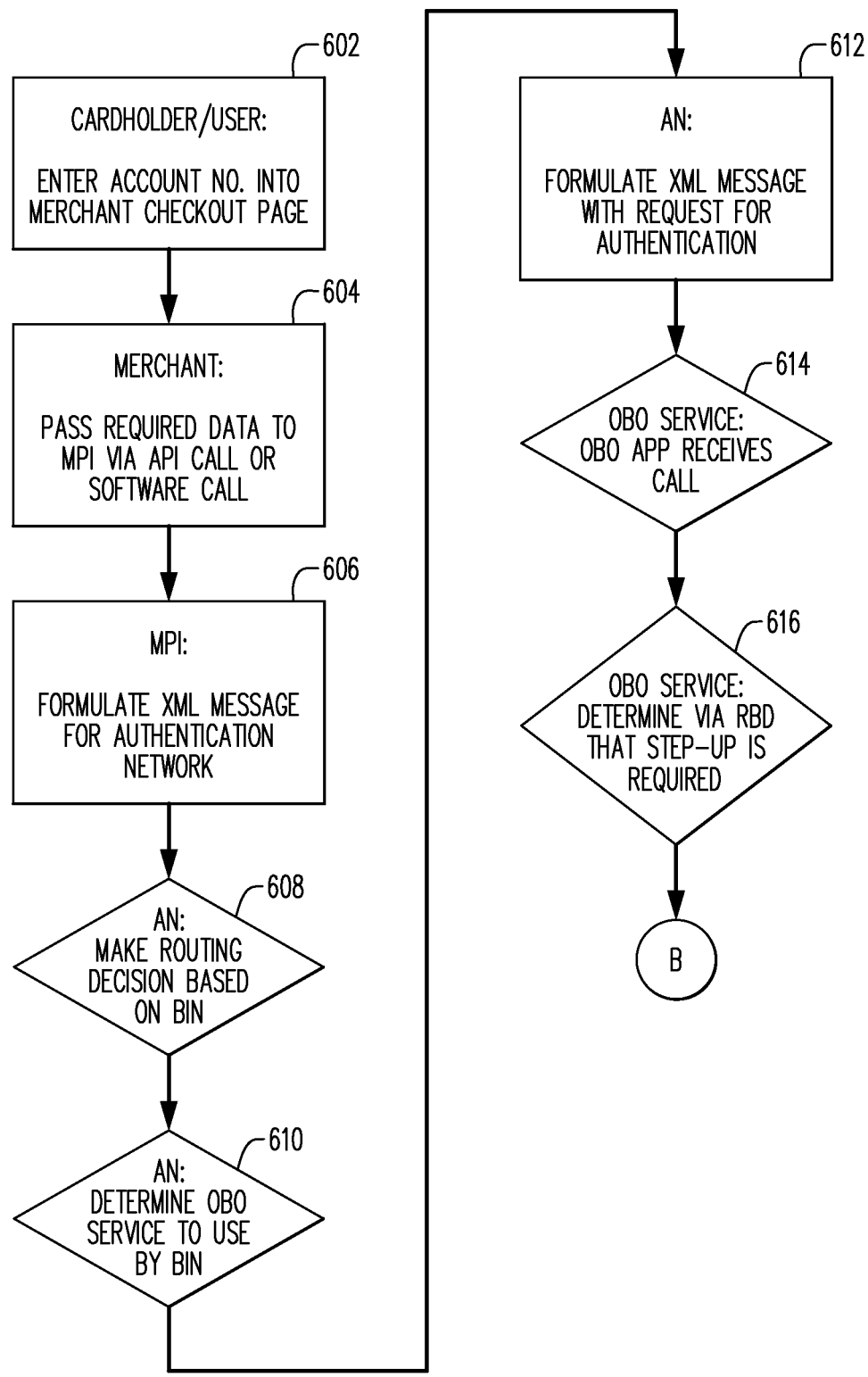
Figure 6B:
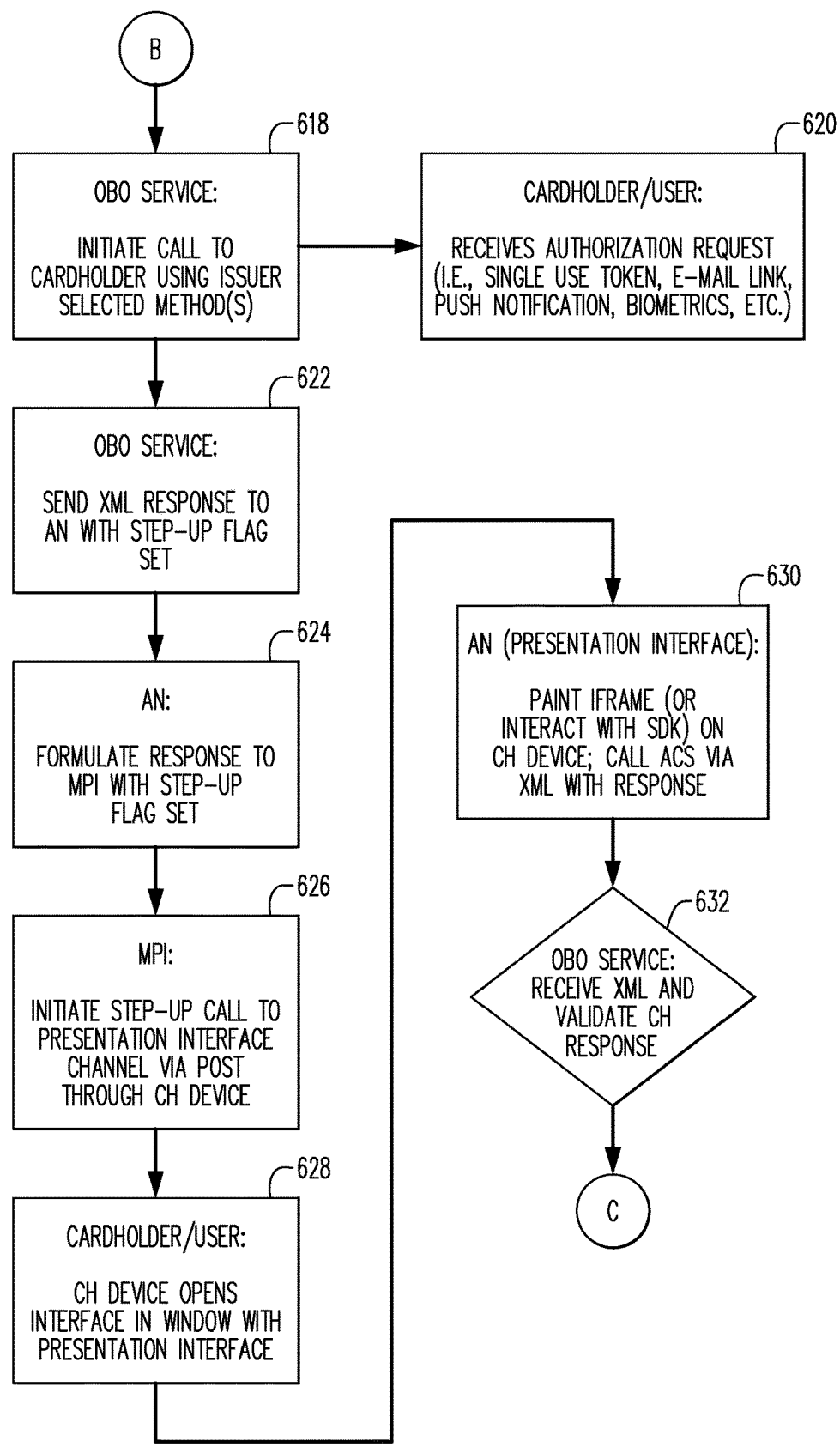
Figure 6C:
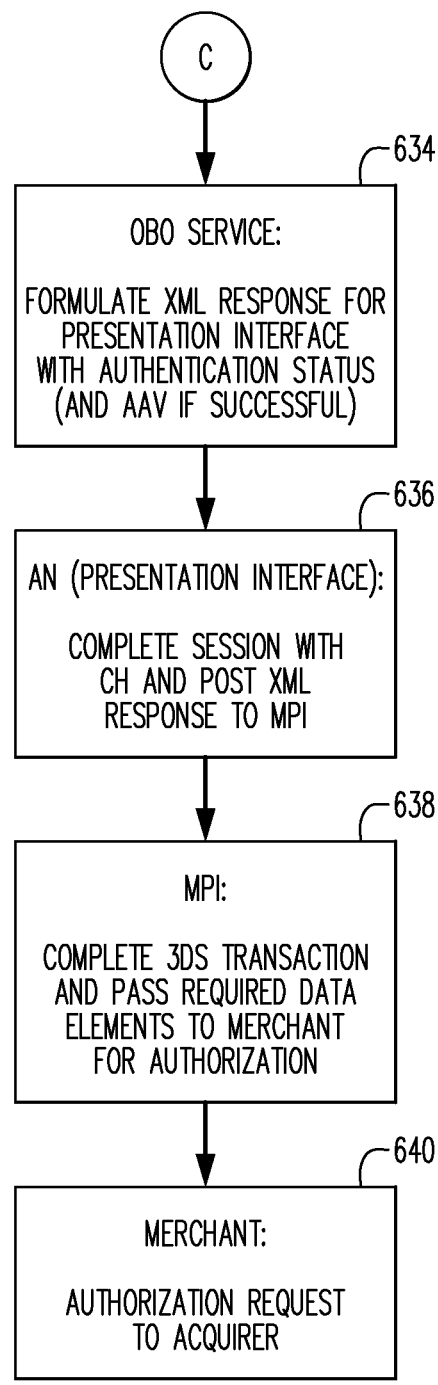

The above discussion related to blocks 502-514 of FIG. 5A is also applicable to blocks 602-614 of FIG. 6A. In the illustrative example shown in FIG. 6A, the OBO service processing 108 determines (decision block 616) that the cardholder is not sufficiently low risk to by-pass the step up process. In other words, based on risk based decisioning (RBD), the OBO service processing 108 determines that step-up is required. Consequently, as indicated at block 618 in FIG. 6B, the OBO service processing 108 may initiate a call to the cardholder/user via the consumer device 102 and/or according to whatever method or methods the card account issuer has prescribed for contacting the cardholder for the step-up process. As indicated at block 620, the cardholder receives an authorization request, which may include one or more of a single use token, an e-mail link, a push notification, a request to provide a biometric authentication, etc.

In conjunction with the process steps shown at 618 and 620, the OBO service processing 108 transmits (block 622) a response to the authentication network 103, where the response may be a message with the step-up flag set to indicate that the step-up process is to be performed. The authentication network 103, in turn, may formulate and transmit (block 624) a response to the MPI, where the response has the step-up flag set. The MPI then initiates (block 626) a step-up call to a presentation interface channel via post through the consumer device 102. The cardholder/user is then involved (block 628) by operating the consumer device 102 to open the step-up interface in a window on the consumer device 102 by using the presentation interface.

At block 630, the authentication network 103, via the presentation interface, loads web content (i.e., HTML, Javascript and the like) to a web browser via i-frame, page redirection, etc., or interacts with Software Development Kit (SDK), on the consumer device 102, and calls the ACS 110 via XML with a step-up response based on the cardholder's input/response to the step-up process requirement(s).

At decision block 632, the OBO service processing 108 may receive the resulting message and determine whether the cardholder response is valid. Then, at block 634 (FIG. 6C), the OBO service processing 108 may formulate and send to the authentication network 103/presentation interface the authentication response. Where the authentication is deemed successful, as assumed here, then the response may include a transaction cryptogram or other token such as an "AAV" (account authentication value).

At block 636, the authentication network 103/presentation interface may complete the session with the cardholder via the consumer device 102 and post a response with the MPI. Then, as indicated at 638 in FIG. 6C, the MPI may complete the 3DS transaction and transmit required data elements to the merchant 114 (FIG. 1) to allow the merchant to proceed (block 640) with what may be an essentially conventional authorization request to the acquirer (not shown). The transaction may then be completed in accordance with conventional practices for e-commerce transactions.

Figure 7:
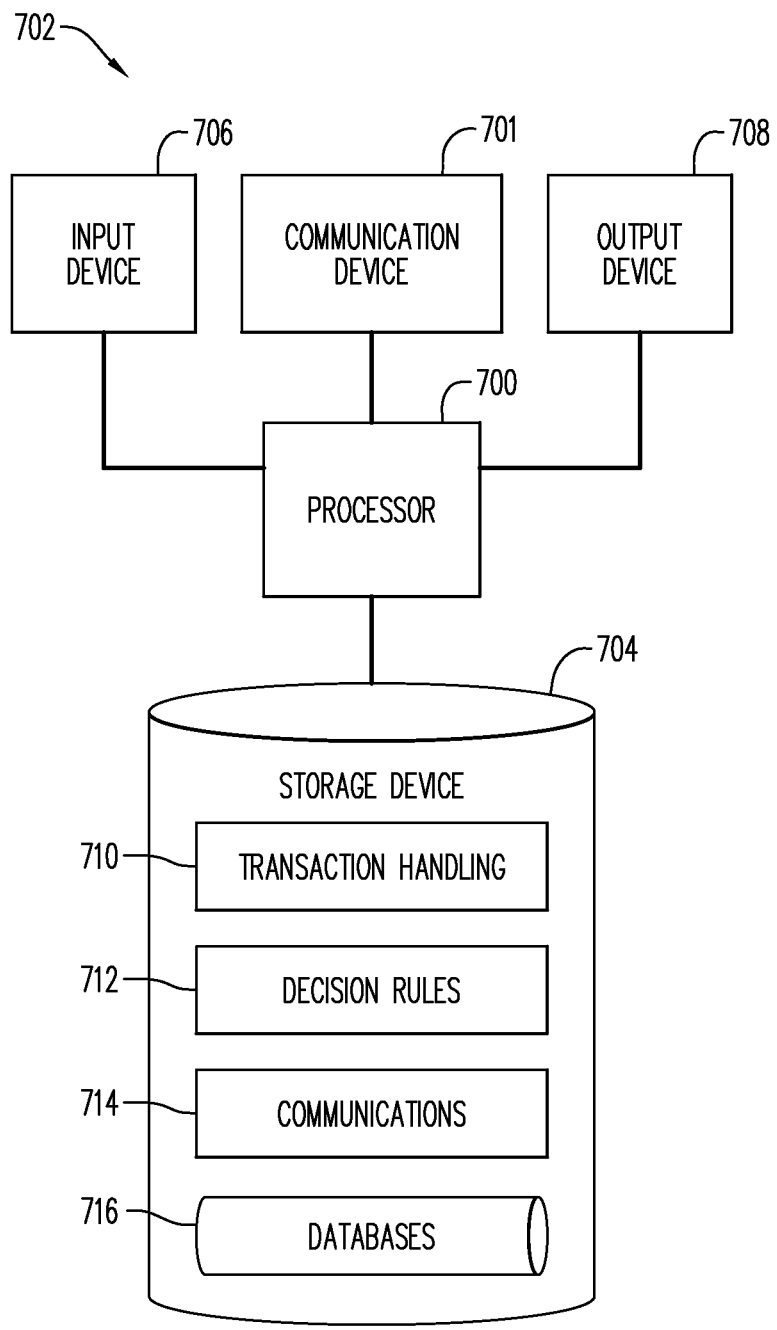
FIG. 7 is a block diagram of a computer system/computer architecture that may constitute one or more components of the transaction system of FIG. 1.

FIG. 7 is a block diagram of a computer system/computer architecture that may constitute one or more components of the transaction system 100 of FIG. 1. For example, the computer system 702 depicted in FIG. 7 may implement one or more of the directory server 106 and/or the OBO service computer 108 and/or another component of the authentication network 103. As discussed further below, the computer system 702 may be programmed in accordance with aspects of the present invention to provide one or more of the functions described herein.

Referring now to FIG. 7, the computer system 702 may be conventional in its hardware aspects but may be controlled by software to cause it to function as described herein. For example, the computer system 702 may be constituted by conventional server computer hardware.

The computer system 702 may include a computer processor 700 operatively coupled to a communication device 701, a storage device 704, an input device 706 and an output device 708.

The computer processor 700 may be constituted by one or more conventional processors. Processor 700 operates to execute processor-executable steps, contained in program instructions described herein, so as to control the computer system 702 to provide desired functionality.

Communication device 701 may be used to facilitate communication with, for example, other devices (such as other components of the transaction system 100). For example, the communication device 701 may include numerous communication ports and interfaces to facilitate communications over-the-air via one or more mobile communication networks (not shown) and/or the communication device 701 may facilitate numerous calls for service via the Internet and/or over one or more private or dedicated data communication networks.

Input device 706 may comprise one or more of any type of peripheral device typically used to input data into a computer. For example, the input device 706 may include a keyboard and a mouse. Output device 708 may comprise, for example, a display and/or a printer.

Storage device 704 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 704 stores one or more programs for controlling processor 700. The programs comprise program instructions (which may be referred to as computer readable program code means) that contain processor-executable process steps of the computer system 702, executed by the processor 700 to cause the computer system 702 to fulfill the functions of one or more system components described herein.

The programs may include one or more conventional operating systems (not shown) that control the processor 700 so as to manage and coordinate activities and sharing of resources in the computer system 702, and to serve as a host for application programs (described below) that run on the computer system 702.

The programs stored by the storage device 704 may include, for example, a transaction handling application program 710. The transaction handling application program 710 may control the processor 700 to enable the computer system 702 to perform one or more of the transaction-related functions described in this disclosure. For example, this may include, at least in part, determining what type or types of authentication service(s) are to be performed for a given transaction based on account-related information such as the account number associated with the account involved in the current transaction. The transactions handled by the computer system 702 may include payment transactions and ID&V (tokenization) transactions.

The storage device 704 may also store one or more decision rules 712 that indicate how the computer system 702 decides from transaction to transaction what authentication service(s) is (are) to be applied. As noted above, the decision rules may be subject to being configured according to input from either or both of the card account issuer and/or the card account user.

In addition, the storage device 704 may store a data communications program 714 such as may be required to allow the computer system 702 to engage in data communications with other components of the transaction system 100.

The storage device 704 may also store, and the computer system 702 may also execute, other programs, which are not shown. For example, such programs may include a reporting application, which may respond to requests from system administrators for reports on the activities performed by the computer system 702. The other programs may also include, e.g., website hosting programs, a database management program, device drivers, etc.

The storage device 704 may also store one or more databases 716 required for operation of the computer system 702.

In accordance with teachings of the present invention, configurability of authentication services, by card account issuers and/or card account users, may allow for authentication processes that meet the issuers' and/or account users' goals for transaction security and convenience. For example, in some embodiments, a particular issuer may specify that for its top tier account holders, step-up will be performed only for quite large purchases, and when step-up does occur a particular biometric process that is convenient for the account holder will be utilized. In some embodiments, the rules specified by the issuer for the top-tier customer may allow RBD to be by-passed for some or most transactions. The authentication network 103 may determine that a particular issuer-configured rule is applicable to a particular transaction based on the payment account number (or portion thereof, such as the BIN) submitted for the transaction. In some embodiments, for other account holders, a conventional RBD process with possible step-up may be applicable.

In accordance with other teachings of this disclosure, the account user may be permitted to configure rules so as to implement the user's preferences with respect to authentication processing. For example, the user may be permitted to indicate a preference for biometric authentication or authentication by PIN entry. In some embodiments, the transaction system 100/authentication network 103 may operate to harmonize the issuer's preferences with the user's preferences. In some embodiments, if there is an insoluble conflict between the issuer's authentication preferences and the user's authentication preferences, the transaction system 100/authentication network 103 may operate such that the issuer's preferences are allowed to prevail.

In some embodiments, authentication rules may also be subject to configuration by merchants in at least some cases. For example, where the merchant has the customer's account information (and/or payment token) on file and the merchant is well acquainted with the customer (and/or has performed its own risk assessment for the customer with a satisfactory result), the merchant may prefer that RBD/possible step-up by the authentication network 103 be bypassed. Thus for a given account number/payment token and a given merchant, a transaction may be processed by the transaction system 100/authentication network 103 such that authentication processing may be determined in accordance with configuration data input from the merchant. According to another example embodiment, the merchant may configure the authentication decisioning such that the transaction will not go through unless the account issuer supports authentication in accordance with the 3DS model. The authentication network 103 may make a determination on this point based on the BIN for the submitted account number.

Configuration data input from the issuer, user or merchant, as the case may be, may be provided from the party in question by a message sent to and received by the authentication network 103 during administrative or set-up activity prior to execution of a transaction that is based on the configuration data input.

Figure 8:
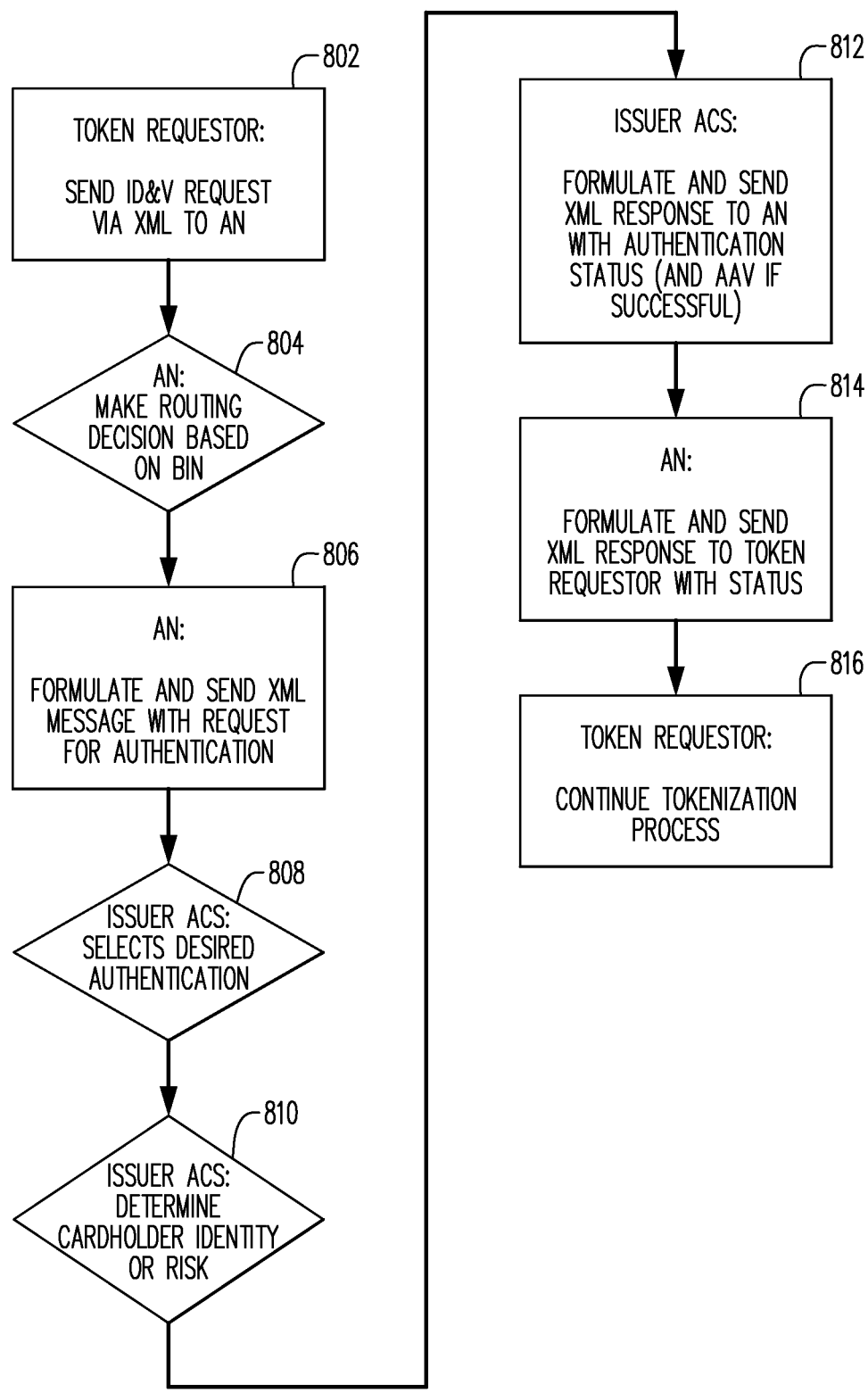
FIGS. 8-9 are flow diagrams illustrating processes according to some embodiments.
Figure 9:
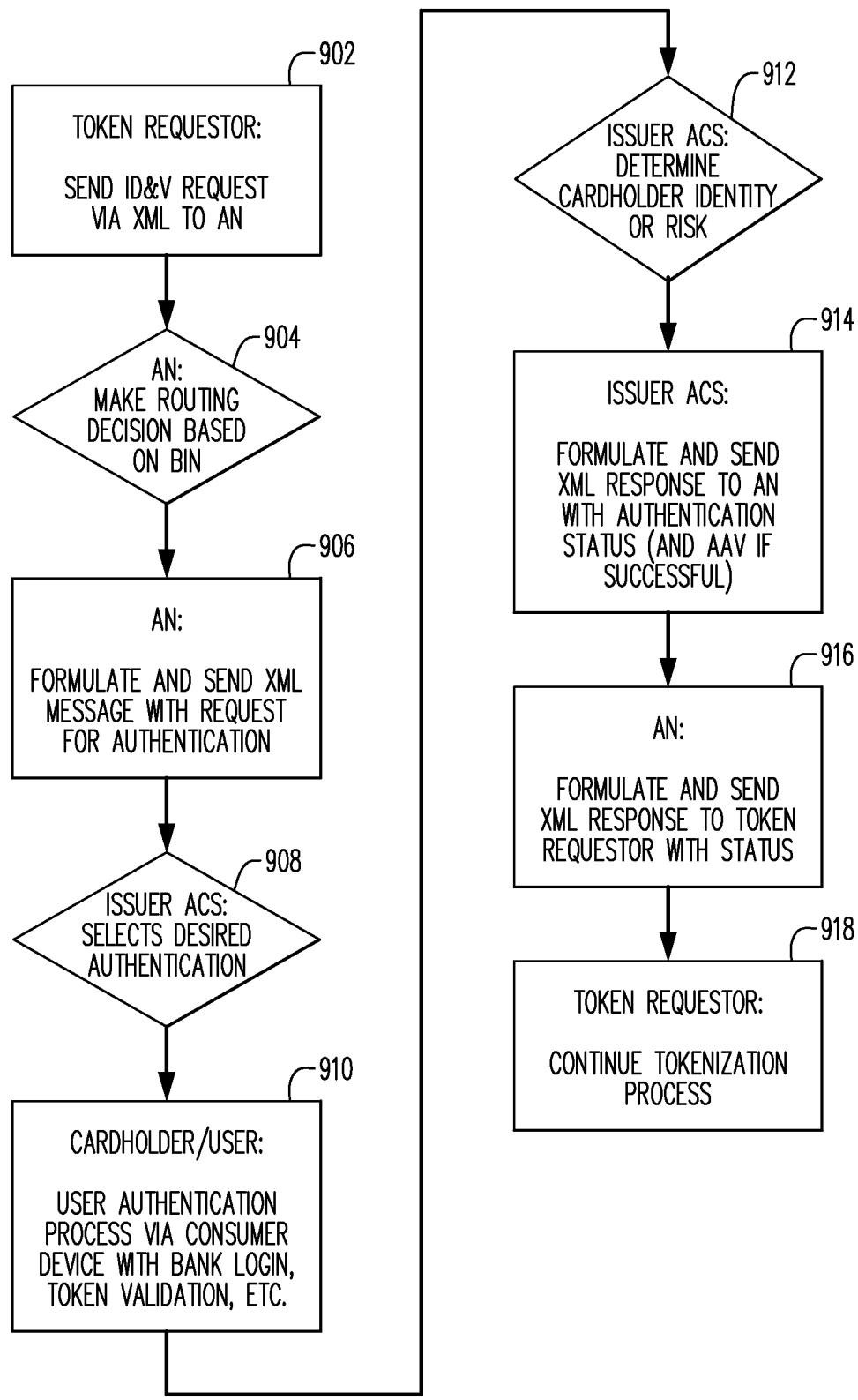

FIGS. 8-9 are flow diagrams illustrating processes according to some embodiments.

FIGS. 8 and 9 illustrate example processes for performing ID&V (identification and verification) in accordance with aspects of the present invention. As is understood by those who are skilled in the art, ID&V may be performed in connection with tokenization operations.

In the scenario of FIG. 8, ID&V is performed without step-up. At block 802 in FIG. 8, the token requestor 202 (FIG. 2) sends an ID&V request to the authentication network 103. Continuing to refer to FIG. 8, at decision block 804, the authentication network 103 (e.g., via directory server 106, FIG. 1), makes a routing determination based on the payment account data (e.g., such as based on the BIN of the payment account). At block 806, the authentication network 103 formulates and sends a message which includes a request for authentication. This message may be sent to an issuer ACS 110 (FIG. 1), with the particular ACS determined and/or the content of the message/request determined at block 804.

At decision block 808, the issuer ACS 110 selects the desired type of authentication process. At decision block 810, the issuer ACS 110 determines the cardholder's identity and/or determines to what extent there is risk involved in the current authentication request. In the illustrative example shown in FIG. 8, the issuer ACS 110 determines that the request is low risk, and transmits (block 812) a response back to the authentication network 103 with the authentication status. Where the authentication is deemed successful, as assumed here, then the response may include a cryptogram or other token such as an "AAV" (account authentication value).

At block 814, the authentication network 103 may formulate and send a response to the token requestor 202, to indicate the authentication status. Then, at block 816, the token requestor 202 may continue the tokenization process.

In some embodiments, the processing in the authentication network 103 or another component of the transaction system 100 may include a determination that some "step up" or increased authentication may be required for the ID&V request. Such an example is shown in the flow diagram presented in FIG. 9.

The above discussion of blocks 802-806 in connection with FIG. 8 is also applicable to blocks 902-906 shown in FIG. 9. At decision block 908 in FIG. 9, the issuer ACS 110 selects the desired type of authentication process. In this illustrative example, it is assumed that the issuer ACS 110 determines (e.g., pursuant to RBD) that step-up should be required. This may involve a user authentication process (block 910), which may entail the cardholder/user interacting with the consumer device 102 to perform a function such as a bank customer login procedure, token validation, etc.

At decision block 912, the issuer ACS 110 may consider the outcome/user response provided at block 910 and on that basis may determine the cardholder's identity and/or determine to what extent there is risk involved in the current authentication request. In the illustrative example shown in FIG. 9, the issuer ACS 110 determines that the request is low risk, and transmits (block 914) a response back to the authentication network 103 with the authentication status. Where the authentication is deemed successful, as assumed here, then the response may include a cryptogram or other token such as an "AAV" (account authentication value).

At block 916, the authentication network 103 may formulate and send a response to the token requestor 202, to indicate the authentication status. Then, at block 918, the token requestor 202 may continue the tokenization process.

In some embodiments, the improved authentication processing is based in part on existing 3-D Secure transaction methods which include modified messaging (including, for example, additional buyer information fields, risk based decisioning data, and other optional data). Additional message types are provided to support new processes such as, for example, tokenization processes. A Web services interface is provided to improve interaction between devices, and routing is provided which allow issuers to specify on-behalf-of and other services.

As used herein and in the appended claims, the term "payment account identifier" includes PANs (primary account numbers) as well as payment tokens used in place of PANs pursuant to a tokenization system.

While teachings of the present disclosure have been described within the context of payment account system processes, those teachings are also applicable to other types of accounts as well, such as customer loyalty accounts, access accounts (e.g., to rooms, buildings, or computing resources and/or webpage accounts), and other types of financial accounts. As used herein and in the appended claims, the term "account" includes a payment account and other types of accounts, including but not limited to those mentioned above, and the term "account identifier" includes a payment account identifier and identifiers of other types of accounts.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method, comprising:
receiving, via a processor, an authentication request of a transaction from a merchant including an account identifier of a payment account of a user;
determining, by the processor, between routing the authentication request directly to an issuer of the payment account and routing the authentication request indirectly to the issuer via an intermediate on-behalf of (OBO) web service that performs an additional biometric authentication of the user than the issuer performs, wherein the determination is made based on a bank identification number (BIN) of the account identifier;
in response to a determination to route the authentication request indirectly to the issuer, loading, by the processor, web content for executing the additional biometric authentication into at least one of a page and a web browser displayed on a user device of the user;
transmitting, via the processor, an authentication response of the user from the web browser to the OBO web service in response to a determination to route the authentication request to the OBO web service;
receiving, via the processor, a response message from the OBO web service which indicates that the additional biometric authentication has been performed successfully; and
transmitting, via the processor, an authentication response indicating the additional biometric authentication is successful to the merchant.

2. The method of claim 1, wherein the loading, via the processor, comprises loading one or more of Hypertext Markup Language (HTML) content, JavaScript content), and i-frame content, into the web browser, for performing the additional biometric authentication.

3. The method of claim 1, wherein the receiving the authentication request comprises receiving, via the processor, the authentication request from a merchant computer via an application programming interface (API) which provides a connection from the merchant computer to the OBO web service.

4. The method of claim 1, wherein the receiving the authentication request comprises receiving, via the processor, the authentication request from a merchant plug-in (MPI) on a consumer device.

5. The method of claim 1, wherein the authentication request comprises an authentication request for an e-commerce card not present (CNP) transaction between a cardholder of the payment account and the merchant.

6. A system, comprising:
a storage configured to store program instructions; and a processor coupled to the storage and configured to execute the program instructions, wherein when executed by the processor, the program instructions cause the processor to:
receive an authentication request of a transaction from a merchant including an account identifier of a payment account of a user,
determine between routing the authentication request directly to an issuer of the payment account for authentication and routing the authentication request indirectly to the issuer via an on-behalf of (OBO) web service that performs an additional biometric authentication of the user than the issuer performs, wherein the determination is made based on a bank identification number (BIN) of the account identifier,
in response to a determination to route the authentication request indirectly to the issuer, load web content for executing the additional biometric authentication into at least one of a page and a web browser displayed on a user device of the user,
transmit an authentication response of the user from the web browser to the OBO web service in response to a determination to route the authentication request to the OBO web service;
receive a response message from the OBO web service which indicates that the additional biometric authentication has been performed successfully, and
transmit, to the merchant, an authentication response indicating the additional biometric authentication is successful.

7. The system of claim 6, wherein the processor is configured to load one or more of Hypertext Markup Language (HTML) content, JavaScript content), and i-frame content, into the web browser for performing the additional biometric authentication.

8. The system of claim 6, wherein the system further comprises an application programming interface (API), and the processor is configured to receive the authentication request from a merchant computer via the API which provides a connection to the OBO web service.

9. The system of claim 6, wherein the processor is configured to receive the authentication request from a merchant plug-in (MPI).

10. The system of claim 6, wherein the authentication request comprises an authentication request for an e-commerce card not present (CNP) transaction between a cardholder of the payment account and the merchant.

* * * * *